United States Patent Office 2,816,086
Patented Dec. 10, 1957

2,816,086

BUTADIENE-FURFURAL REACTION PRODUCTS COMBINED WITH VINYL POLYMERS

Mortimer T. Harvey, South Orange, and Peter L. Rosamilia, Newark, N. J., assignors to Harvel Research Corporation, a corporation of New Jersey No Drawing. Application June 10, 1953
Serial No. 360,827

8 Claims. (Cl. 260—45.5)

This invention relates to novel compositions and to methods for making the same. In one of its more specific aspects this invention is directed to providing novel compositions and articles of manufacture by combining (I) normally solid polymers and copolymers of vinyl compounds with (II) certain furfural and butadiene 1,3 reaction products, some of which prior to our inventions disclosed in our copending applications Serial No. 211,576, filed February 17, 1951, now abandoned, and Serial No. 338,876, filed February 5, 1953, had been regarded commercially as waste products. This application is a continuation in part of the before-identified applications.

Prior to this invention, furfural and butadiene 1,3 have been reacted under varying conditions. A product of such reactions generally consisted of a dark colored, tarry mass. Such masses were varying in consistency from practically solid, semi-solid, to thick yet fluid masses. Such masses are composed essentially of complex mixtures of reaction products of furfural and butadiene in various molecular proportions, with a substantial part being in polymeric form. Before our invention, such dark colored, tarry masses were not found useful commercially and for years were regarded and treated as useless, waste products presenting a disposal problem. In the art of purification of butadiene in which the furfural extractive distillation method in the purification of butadiene is employed, said tarry masses are by-products of the process and were disposed of by burning in some instances.

Herbolsheimer in his United States Patent 2,483,903, issued on October 9, 1949, states that he produces a light colored liquid reaction product of furfural and butadiene having average molecular weight of about 210, and that the fractions thereof have boiling points in the temperature range of 200–320° F. at an absolute pressure of 1 mm. of mercury pressure and also that tarry by-products are undesirable but are formed, are separated from his liquid reaction products and are of little, if any, commercial value.

In the course of our experimentation with such waste products, we have discovered that unique and highly useful compositions of matter may be produced by combining (I) one or a combination of two or more normally solid polymers and copolymers of various vinyl esters, and vinyl acetals, such as polyvinyl chloride, polyvinyl acetate, copolymers of vinyl acetate and vinyl chloride, polyvinyl formal and polyvinyl butyral, and (II) reaction product of furfural and butadiene having average molecular weight of at least 330, viscosity of at least 2000 centipoises at 25° C., softening point (ball and ring) of at least 60° F., liquid at 250° F. and is soluble in furfural, the ratio by weight of (I) to (II) being 100 parts of (I) to 5–2000 parts of (II). Said combinations of (I) and (II), if desired, may be intimately combined by milling or other convenient manner with one or a combination of two or more products (III) which are natural rubber, reclaimed rubber, rubbery polymers of chloroprene known on the market as "neoprene," rubbery homopolymers of butadiene, rubbery copolymers of butadiene and styrene, rubbery copolymers of butadiene and acrylonitrile, and rubbery reaction products of dihalogenated ethylene and polysulphide known on the market as "Thiokol," with the ratio by weight of (III) to the combination being 100 parts of the former to 3–200 parts of the latter.

While various methods for producing said reaction products (II) and a number of them are now available, we shall illustrate this invention by employing herein one of them which will be sufficient to illustrate and teach the invention to those versed in the art.

There is collected and obtained a batch of what is termed the "polymeric residue formed in the furfural extractive distillation method for the purification of butadiene." (A report on such residues appears in an article entitled "Butadiene-Furfural Copolymers," by Hillyer et al., Ind. and Eng. Chem., vol. 40, November 1948, pages 2216–2220, reference to which is hereby made.) This residue, which is a waste product, generally is combined with water and therefore the batch is first placed in an oven and maintained at elevated temperature until substantially completely dehydrated. The dehydration may be effected either at atmospheric or subatmospheric pressure and the temperature employed, of course, may vary but in factory practice we prefer that it be at least about 200° F. and in most cases in the range of 200–300° F., although higher temperatures may be employed. The resultant, dehydrated mass of said residue is a dark colored, tarry mass which may vary in consistency from substantially solid, semi-solid to fairly fluid, thick liquid depending upon the conditions of operation of the main extractive distillation units as well as the distillation units in the furfural extractive distillation method used. Said dark colored, tarry masses generally have an average molecular weight of at least 330, a softening point (ball and ring) of at least 60° F., a viscosity of at least 2000 centipoises at 25° C., are liquid at 250° F., and are soluble in furfural. If not, the dehydrated mass is maintained at a temperature in the range of 300–400° F. in the presence of acidic or basic catalyst which results in driving off of volatiles and quick thickening or polymerization to increase the average molecular weight, viscosity and softening point to said required minimums.

Then said mass which will now be termed product II A is ready for use or may be further processed if desired. In this particular example, product II A is thick, yet fluid and has an average molecular weight of above 330, viscosity greatly above 2000 centipoises at 25° C., softening point (ball and ring) of 75° F., is liquid at 250° F., and is soluble in furfural.

A portion of product II A may be heated to and maintained at a temperature in the range of 300–400° F. either at atmospheric or sub-atmospheric pressure until the viscosity thereof at 25° C. has greatly increased or until cooled to room temperature when it is in the semi-solid or substantially solid state and apparently due to polymerization and driving off of some volatiles has an average molecular weight of at least 600, a softening point (ball and ring) of at least 130° F., is thermoplastic, and is liquid at 250° F. Such products are hereinafter known as products II B.

Thickening of product II A may also be carried out at 300–400° F. as before to the semi-solid or solid state but in this instance in the presence of an acidic or alkaline catalyst, and for most purposes is the method which we prefer because of the higher yields, lower loss of volatiles and speed of thickening. The temperature employed in factory practice is approximately 325–350° F., and examples of acidic catalysts are diethyl sulfate, boron trifluoride, sulphuric acid, hydrochloric acid, etc., which may be added in a dilute state in a carrier to prevent local action. When dilute sulphuric or hydrochloric acid is employed, we use, for example, about .5–2 parts for each 100 parts of product II A, and when diethyl sulfate is used, we use, for example, about 1-5 parts for each 100 parts of product II A. Examples of some of the cheap alkaline catalysts which may be employed are sodium hydroxide, potassium hydroxide, and calcium hydroxide, and in general 1-5 parts of said alkaline catalysts are employed for each 100 parts of product II A. Of course, it is understood that various other acidic and alkaline catalysts may be used.

The normally solid or semi-solid products produced in the presence of an acidic catalyst are known as products II C and those produced in the presence of an alkaline catalyst are known as products II D, and products II C and II D, all like products II B, will have average molecular weight of at least 600, are thermoplastic, liquid at 250° F., are soluble in furfural and are at least about 70% soluble in acetone.

According to this invention, said (II) reaction products of butadiene and furfural having average molecular weight of at least 330, softening point (ball and ring) of at least 60° F., viscosity of at least 2000 centipoises at 25° C., are liquid at 250° F., and being soluble in furfural, specific examples of which products in the substantially dehydrated condition are products II A, products II B, products II C and products II D, may be combined with one or a combination of two or more of said materials (I), preferably in the proportions heretofore set forth. Such combinations may be combined with other appropriate materials employed in the compounding of the chosen materials (I) and then molded, extruded or shaped in any other manner and procedure according to usual procedure well known to the art. Said combinations of materials (I) with reaction products (II) with and without material (III) may be employed to provide a wide variety of useful products finding application in a number of different fields. They may be extruded to produce tubings of various diameters finding utility in the field of electrical insulation and in other fields. They may be formed into sheets and coatings on fabric bases and employed for their water resistance and electrical insulation characteristics. In some cases when products (II) are combined with (I) they have the unusual properties of extending the film formation of (I) and at the same time acting as a secondary plasticizer so that it is possible to obtain products of the same tensile strength, elongation and hardness by substituting one or a combination of two or more products (II) for part of the material (I) and for part of the expensive plasticizer normally employed.

While said reaction products (II) having melting points of at least 60° F. (ball and ring) may be employed in the practice of this invention, for most purposes we employ those having softening points (ball and ring) in the range of 60-250° F. However, those which are far superior are those which have melting points (ball and ring) in the range of about 130-210° F.

The following examples are given by way of merely illustrating various methods for preparing various types of reaction products (II), all parts throughout this entire description and claims being by weight unless otherwise specified.

*Example 1*

Into an oven maintained at 260-280° F. was placed a steel drum containing 485 lbs. of raw residue, and being a residue obtained as a by-product in the purification of butadiene in which the furfural extractive distillation method was employed. Said residue is allowed to stand in that oven at that temperature for a period of about 15-18 hours whereupon said residue was completely dehydrated and some of the higher volatiles originally contained therein had been driven off. At the end of that period the mass in the container was weighed and found to be 412 lbs. of a dark, thick yet fluid mass soluble in furfural, having an average molecular weight above 330, having a viscosity above 2000 centipoises at 25° C., and having a softening point (ball and ring) above 60° F., and being liquid at 250° F. This product is hereinafter known as product II AP. If desired, said product II AP may be thickened by heating in the presence or absence of an acidic or alkaline catalyst and at atmospheric or sub-atmospheric pressure to thicken the same and increase its average molecular weight and softening point (ball and ring) to values above 330 and preferably to at least 600 and above 60° F., and preferably to 130-210° F. and is liquid at 250° F. For example, the entire 412 lb. mass may be transferred to an open kettle and heated to approximately 425° F. and maintained at that temperature for approximately 2-5 hours. Then the source of heat may be removed and the resultant mass poured into pans and allowed to cool to room temperature. At this temperature the mass will be a thermoplastic solid, liquid at 250° F., insoluble in hot and cold VMP naphtha and will have a softening point (ball and ring) of 178° F. consisting chiefly of a highly polymerized reaction mass weighing approximately 305 lbs. This product which may be hereinafter known as product II BP may be crushed and employed in the practice of this invention.

*Example 2*

Into a closed vessel is charged approximately 500 lbs. of raw residue, said residue being that obtained as a by-product in the purification of butadiene in which the furfural extractive distillation method is employed. While under a vacuum of about 28 inches of mercury, the temperature of the raw residue is elevated slowly over about a one hour period until it reaches approximately 215° F., then the source of heat is removed and the vacuum is broken. The resultant mass weighs approximately 375 lbs., is thick but pourable, has a molecular weight above 330, a viscosity above 2000 centipoises at 25° C., and is soluble in furfural, has a softening point (ball and ring) above 60° F., and is liquid at 250° F. The material which distilled over during the course of that heat treatment under vacuum consisted mainly of water together with a small amount of light volatiles. This product, said 375 lb. mass, is hereinafter known as product II AS. If desired, while under the same degree of vacuum the mass may be further heated and maintained at a temperature of 325-350° F. whereupon more volatiles come off and the remainder is so thickened or polymerized that a sample thereof when cooled to room temperature has a softening point (ball and ring) of 130-210° F. At that stage the mass is cooled to room temperature and will be found to be a thermoplastic and substantially solid resinous mass, liquid at 250° F., and hereinafter known as product II BS. If desired, said 375 lb. mass may be heated to elevated temperatures of approximately 300-325° F. in the presence of 1-2% of an acidic catalyst such as diethyl sulfate, or an alkaline catalyst such as sodium hydroxide and maintained at that temperature for about 1-2 hours either under vacuum or at atmospheric pressure until a sample thereof when cooled to room temperature has a softening point (ball and ring) of 130-210° F. At that stage the heat is removed and the mass is cooled in pans and such products at room temperature will be in the substantially solid state, liquid at 250° F., and hereinafter known as products II CS and products II DS, respectively.

*Example 3*

Following the procedure set forth in either Example 1 or Example 2 and employing another raw residue, there are obtained products similar and corresponding to those of Examples 1 and 2 and known as products II AN, II BN, II CN, and II DN.

The following examples are given merely by way of illustrating an aspect of the invention, all parts being given by weight unless otherwise defined.

Example 4

100 parts of one or a combination of two reaction products (II), examples of which are products II A, II B, II C, II D, II AP, II BP, II AS, II BS, II CS, II DS, II AN, II BN, II CN, and II DN, and 5 parts of one or a combination of two or more of said materials (I) in powdered or granular form are charged into a vessel and the mixture is heated therein to a temperature of about 350° F. and maintained at that temperature for 15–20 minutes. Then it is poured into pans and cooled to room temperature. The resultant product, being liquid, semi-solid or solid depending upon the viscosity of the particular reaction product (II) used may be combined with one or a combination of two or more of said rubbery materials (III) by milling or mixing the same therewith and together with other compounding materials, if desired, and then curing. Besides having the material (I) incorporated therewith, the ozone resistance of the material (III) will have been materially increased due to the presence of product (II).

In the preparation of the combination of product (II) with (I), the ratio of the latter to the former may be increased to increase the viscosity or rigidity of the combination when cooled. Also where desired, any of the well known plasticizers for the particular material (I) may also be employed together with (I) and (II). It will be found that with (II) present, the amount of such plasticizers will be less than normally required for obtaining stocks of certain physical characteristics.

Example 5

About 160 parts of polyvinyl chloride ("Geon 101"), 74 parts of a mixture of plasticizers normally used for plasticizing polyvinyl chloride and 4 parts of a mixture of stabilizers therefor were intimately combined with each other to uniformity. This mixture was extruded in the form of a tubing A of .059" in thickness which was the control.

The same formulation as above was made up, except that the amount of "Geon 101" was reduced as was the amount of mixed plasticizer, and there was added 1.5 additional parts of a stabilizer. In this instance the formulation consisted of about 120 parts of "Geon 101," 40 parts of product II A which had been maintained at 250–400° F. until its viscosity at 25° C. was 10,000–15,000 centipoises, 40 parts of the mixed plasticizers and 5.5 parts of mixed stabilizers. The uniformly mixed ingredients are extruded to provide tubing B of .059" in thickness which is black in color and has a slightly aromatic odor.

A comparison of the physical characteristics of tubing A and tubing B were run and the determinations were as follows:

|  | Tubing A | Tubing B |
| --- | --- | --- |
| Tensile strength | 2,915 | 2,920 |
| Elongation | 262 | 245 |
| Hardness | 93 | 93 |

If desired, the ratio of the polyvinyl chloride to the reaction product (II) employed may be increased or decreased depending upon the characteristics desired in the finished product. To obtain approximately corresponding physicals, when that ratio is increased, the amount of the primary plasticizers is increased; but when that ratio is decreased, the amount of primary plasticizers is decreased. This has been determined by the stocks which have been produced by employing said "Geon 101" to said product (II) in ratios of 3:1 to 1:1.

Example 6

About 100 parts of polyvinyl chloride ("Geon 121"), 20 parts of butyl benzoyl phthalate, 40 parts of product II A which had been maintained at 250–400° F. until its viscosity at 25° C. was approximately 25,000 centipoises, and a plastisol consisting of 5 parts of polyvinyl chloride ("QYNA") and 5 parts of dioctyl phthalate were mixed to uniformity and some of the mass extruded into plastic tubing and the remainder into sheets, both of which were flexible and smooth.

Example 7

About 50 parts of polyvinyl chloride ("Geon 121"), 25 parts of a very inexpensive plasticizer, "Sovaloid C," a petroleum derived plasticizer of Socony Vacuum Oil Co., Inc., and 25 parts of product II AP having a viscosity at 25° C. of approximately 10,000 centipoises were thoroughly mixed together to uniformity. The mix was spread in a thin layer on a smooth aluminum base and then heated to about 320° F. whereupon fusion took place. It was allowed to cool to room temperature and then stripped from the base. The resultant product was a sheet of flexible, rubbery nature and is suitable for use as electrical insulation and water proofing. This may also be employed as backing, laminating films and the like.

Example 8

Employ the same procedure and components as set forth in Example 7 except that for the "Sovaloid C" employ "Monoplex S–38," of Rohm and Haas, which is a low cost monomeric primary plasticizer.

"Sovaloid C" is a light-bodied "true softener" oil, composed entirely of aromatic hydrocarbons, A. P. I. gr. 3.0; sp. gr. 1.052; flash point 335° F., distillation range, 580–760° F.; non-polar in character.

"Monoplex S–38" is a monomeric type plasticizer, mol. wt. 500–600, sp. gr. 0.940; color, dark; viscosity 3–11 poises at 25° C.; refractive index 1.489 at 25° C.; acid number, 5; freezing point, 6; saponification number 7 and flash point 277° C.

Example 9

Employ the same procedure as that of Example 7 and use 50 parts of polyvinyl chloride and 50 parts of product II AP. The resultant sheet produced while of a rubbery nature was much stiffer than the products of Examples 7 and 8.

Example 10

The cold mix of Example 7 or 8 may be soaked into an open mesh fabric to impregnate and coat it or may be coated on to other bases and then heated to about 320° F. and allowed to cool to provide a base carrying a rubbery flexible impregnant and coating. There also may be employed various pigments in the cold mix, especially where dark colors are desired. For such coatings, any of the other vinyl polymers and copolymers may be employed.

Example 11

100 parts of product II AP and 10 parts "VYNS" (a copolymer of about 90% vinyl chloride and 10% vinyl acetate) were heated to 150° C. and allowed to cool to room temperature giving a soft rubbery gel-like product hereinafter known as product C and having a high V. M. and P. naphtha and toluol resistance.

While most of Examples 4–11 illustrate the use of polyvinyl chloride and reaction products of the II A series, it is to be understood that the other polymers and copolymers as well as the other reaction products II may be substituted respectively therefor. Of course, it is to be understood that the physical characteristics of the finished products may be changed by such substitutions and that certain of the polymers or copolymers are more desirable for certain purposes than would be others.

It is also within the purview of this invention to combine one or more of said reaction products (II), with or without (I), with one or a combination of two or more of the following: (IV) normally solid cellulose ethers and esters such as methyl cellulose, ethyl cellulose, cellulose nitrate, cellulose acetate, etc., organic reaction products liquid at 250° F., (V) being resinous reaction products of furfuryl alcohol and formaldehyde disclosed in U. S. Patent 2,343,972, (VI) being resinous reaction products of acid condensation polymerization products of furfuryl alcohol and formaldehyde disclosed in U. S. Patent 2,343,973, (VII) organic reaction products of furfural and a ketone, reacted under alkaline conditions and also said reaction products reacted with formaldehyde under acidic conditions, all disclosed in U. S. Patent 2,363,829, (VIII) acid polymerized furfural-ketone reaction products disclosed in U. S. Patent 2,461,508, (IX) partially hydrogenated furfural-ketone organic reaction products, either in the thickened or unthickened condition either unreacted or then reacted with an aldehyde or aldehyde donor, all disclosed in U. S. Patents 2,600,403 and 2,600,764. The ratio by weight of (II) to one or a combination of two or more products IV–IX may vary over wide limits, depending upon the characteristics desired in the ultimate product, and may be 1000 parts by weight of the former to 20–100 parts of the latter. The combinations may be effected by the use of a solvent, if desired, although it may be omitted and with the aid of heat. For example, the components may be mixed together and heated to about 320° F. and with or without the aid of a catalyst when said reaction products are employed. The resulting compositions may be milled into rubbery materials (III), and also find application as protective coverings and binders.

Since certain changes may be made in the aforesaid compositions of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to our novel composition of matter herein claimed without departing from the spirit of the invention. Particularly it is to be understood that in said claims ingredients or components recited in the singular are intended to include compatible mixtures of said ingredients wherever the sense permits.

We claim:

1. A novel composition of matter comprising an intimate combination of (I) a normally solid material selected from the group consisting of polyvinyl chloride, polyvinyl acetate, copolymers of vinyl chloride and vinyl acetate, polyvinyl formal and polyvinyl butyral, and (II) reaction product of furfural and butadiene having average molecular weight of at least 330, viscosity of at least 2000 centipoises at 25° C., softening point (ball and ring) of at least 60° F., and being liquid at 250° F., the ratio by weight of (I) to (II) being 100 parts of (I) to 5–2000 parts of (II).

2. A novel composition of matter comprising an intimate combination of (I) a normally solid material selected from the group consisting of polyvinyl chloride, polyvinyl acetate, copolymers of vinyl chloride and vinyl acetate, polyvinyl formal and polyvinyl butyral, and (II) reaction product of furfural and butadiene having average molecular weight of at least 600, a softening point (ball and ring) of at least 130° F., and is liquid at 250° F., the ratio by weight of (I) to (II) being 100 parts of (I) to 5–2000 parts of (II).

3. A composition defined in claim 1 and a plasticizer for said material (I).

4. A composition defined in claim 1, with said material (I) being normally solid polyvinyl chloride.

5. A novel composition of matter comprising a composition defined in claim 1 intimately combined with (III) a rubbery material selected from the group consisting of homopolymers of butadiene, polymers of chloroprene, copolymers of butadiene and acrylonitrile, copolymers of butadiene and styrene, and organic reaction products of dihalogenated ethylene and polysulphide.

6. A novel composition of matter comprising a composition defined in claim 2 intimately combined with (III) a rubbery material selected from the group consisting of homopolymers of butadiene, polymers of chloroprene, copolymers of butadiene and acrylonitrile, copolymers of butadiene and styrene, and organic reaction products of dihalogenated ethylene and polysulphide.

7. A composition defined in claim 1, wherein said material (I) is a normally solid copolymer of vinyl acetate and vinyl chloride.

8. A composition defined in claim 1 wherein said material (II) is a dehydrated and heat treated plant residue obtained in the furfural extractive method in the purification of butadiene.

References Cited in the file of this patent

UNITED STATES PATENTS

| | | |
|---|---|---|
| 1,933,715 | Day | Nov. 7, 1933 |
| 2,372,668 | Hachmuch | Apr. 3, 1945 |
| 2,440,442 | Hillyer et al. | Apr. 27, 1948 |
| 2,475,094 | Hillyer et al. | July 5, 1949 |
| 2,483,903 | Herbolsheimer | Oct. 9, 1949 |
| 2,516,317 | Harvey | July 25, 1950 |

OTHER REFERENCES

Hillyer et al., Ind. Eng. Chem., volume 40, pages 2216 to 2220 (1948).